United States Patent [19]

Lindsey

[11] Patent Number: 5,291,723
[45] Date of Patent: Mar. 8, 1994

[54] TREE TRIMMING MACHINE AND METHOD

[76] Inventor: Robert J. Lindsey, 15675 Orange Ave., Ft. Pierce, Fla. 34945

[21] Appl. No.: 42,522

[22] Filed: Apr. 5, 1993

[51] Int. Cl.⁵ ............................ A01D 34/73; B27L 1/10
[52] U.S. Cl. ........................................... 56/235; 30/379
[58] Field of Search ................. 56/6, 233, 234, 235; 144/27, 343; 30/379

[56] References Cited

U.S. PATENT DOCUMENTS

| Re. 26,793 | 2/1970 | Patterson et al. | 56/235 |
| 2,926,480 | 3/1960 | Kimball | 56/235 |
| 2,952,485 | 4/1976 | McRobert | 56/235 |
| 4,257,213 | 3/1981 | Brumat | 56/233 X |

FOREIGN PATENT DOCUMENTS 348175  9/1973  U.S.S.R. ............................ 144/2 Z

Primary Examiner—David J. Bagnell
Attorney, Agent, or Firm—Carroll F. Palmer

[57] ABSTRACT

Methods for trimming trees with a machine that includes an elongated boom pivotally connected to the upper portion of a mast for elevational movement with the mast, an inboard rotor and an outboard rotor both rotatably mounted on the boom and a plurality of saws rotatably carried on each of the inboard and outboard rotors for rotation in a generally parallel plane are improved to prevent cuttings from accumulating in the tops of trimmed trees by rotating the inboard rotor and the saws carried thereby counterclockwise and rotating the outboard rotor and the saws carried thereby clockwise. Machines for carrying out the improved methods are disclosed.

4 Claims, 1 Drawing Sheet

TREE TRIMMING MACHINE AND METHOD

BACKGROUND OF THE INVENTION

1. Field of the Invention

This application relates to tree trimming machines and methods. More particularly, it concerns mobile machines used to top and trim trees, e.g., rows of citrus trees in groves, apple trees in orchards, etc., to maintain then in proper growing condition to produce high fruit yield.

2. Description of the Prior Art

Fruit and nut bearing trees require periodic trimming of their tops and sides in order to maintain them in good growing condition for maximum yield and to assist in harvest of their crop. Hence, a variety of machines have been developed for this purpose as disclosed in the following U.S. patents:

U.S. Pat. No. 2,926,480
U.S. Pat. No. 2,940,486
U.S. Pat. No. 3,157,016
U.S. Pat. No. 3,214,895
U.S. Pat. No. 3,395,520
U.S. Pat. No. 3,415,046
U.S. Pat. No. 3,913,304.

One form of machine made and sold by FMC Corporation that has been widely used for tree trimming is disclosed in U.S. Pat. No. Re. 26,793, the contents of which are incorporated herein by reference. This FMC machine is capable of both height and angular adjustment permitting trees to be cut with a flat top or peaked top. While it is a "single boom" machine on which a pair of rotors that carry a plurality of circular saws are supported, "double boom" machines have been developed and used (see U.S. Pat. No. 3,415,046 supra).

Trees in groves and orchards are conventionally planted in rows with middles (lanes) between them over which machinery needed to work them can be moved. Typically, a tree trimming machine will move along one of these lanes while its boom or booms extend laterally over the trees to allow the rotating saw to cut brush from them. One problem associated with such type operation is removing the cut brush. Thus, the brush has a tendency to fall onto or into the trimmed tree which is unacceptable since, if it is left there, it will diminish crop growth and/or become a source of disease. Hence, tree trimming machines have been provided with additional devices, e.g., resilient brush engaging fingers, designed to convey or force cuttings to move away from the trees during the cutting operation. The present invention provides a unique improvement in prior known tree trimming machines to attain required cut brush removal without need for such additional devices.

OBJECTS

A principal object of the invention is the provision of new improvements in tree trimming machines and methods.

A further object is the provision of unique improvements in prior known tree trimming machines and methods to attain required cut brush removal.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of improvements in prior known tree trimming machines and methods to prevent cuttings from accumulating in the tops of trimmed trees.

The improvements of the invention are applied to tree trimming machines that comprise a mobile base, at least one telescoping mast projecting upwardly from the base, an elongated boom pivotally connected to the upper portion of the mast for elevational movement with the mast and for pivoting in a vertical plane relative to the upper mast portion, an inboard rotor and an outboard both rotatably mounted on the boom, a plurality of saws rotatably carried on each the inboard and outboard rotors for rotation in a generally parallel plane and actuating means between the boom and the upper portion of the mast for pivoting the boom relative to the upper portion to vary the position of the plane relative to the horizon.

The improvements of the invention in part comprise providing first power means to rotate the inboard rotor and the saws carried thereby counterclockwise and second power means to rotate the outboard rotor and the saws carried thereby clockwise.

The improvements of the invention further comprise carrying out tree trimming methods by rotating the inboard rotor and the saws carried thereby counterclockwise and by rotating the outboard rotor and the saws carried thereby clockwise.

In preferred embodiments of the invention, the improved tree trimming machines have a second boom structured similarly to the first boom.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
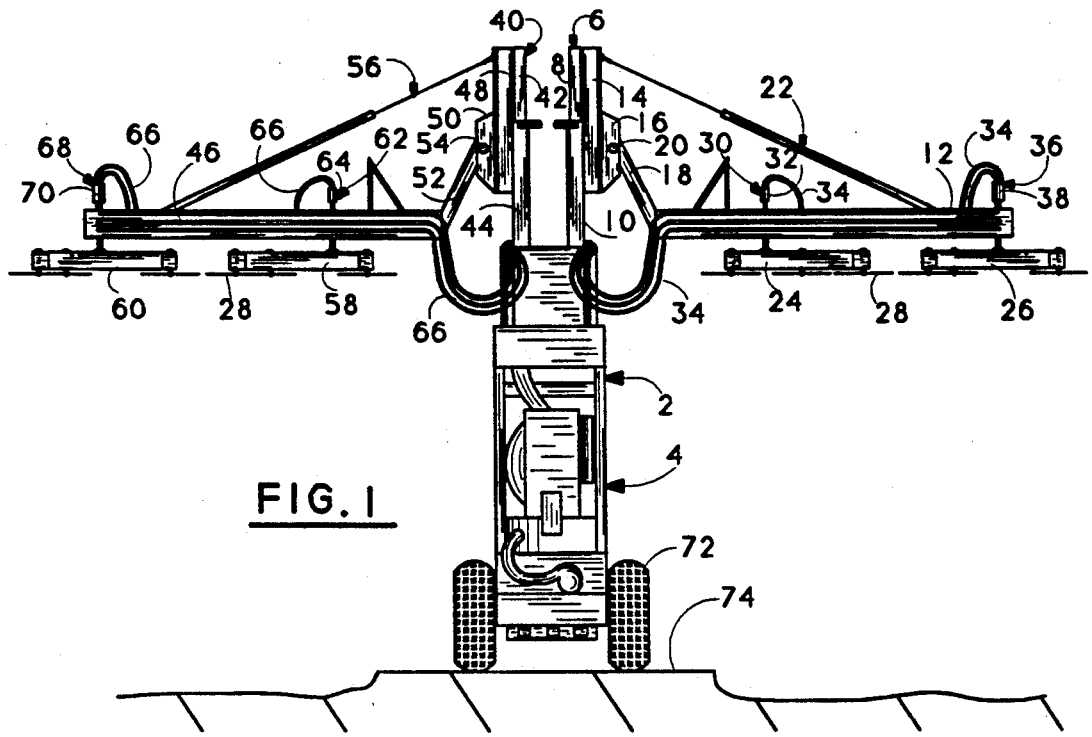
FIG. 1 is rear, elevational view of a double boom, tree trimming machine of the invention.

Referring in detail to the drawings, a tree trimming machine 2 of the invention includes a mobile base 4, a first mast 6 projecting upwardly from the base 4 comprising an upper section 8 that telescopes into a lower section 10.

An elongated boom 12 is pivotally connected to the upper section 8 of mast 6 for elevational movement therewith and for pivoting in a vertical plane relative to the upper section 8. The connection of boom 12 to section 8 comprises beam 14, bracket 16 and lever arm 18 which pivots about pin 20 under control of cable system 22 which serves as actuating means between the boom and the upper portion of the mast for pivoting the boom relative to the upper portion to vary the position of the plane relative to the horizon.

An inboard rotor 24 and an outboard rotor 26 are rotatably mounted on the boom 12. Three saws 28A, 28B and 28C are carried on rotor 24 for rotation in a generally parallel plane. Three saws 28D, 28E and 28F are similarly carried on rotor 26.

Figure 2:
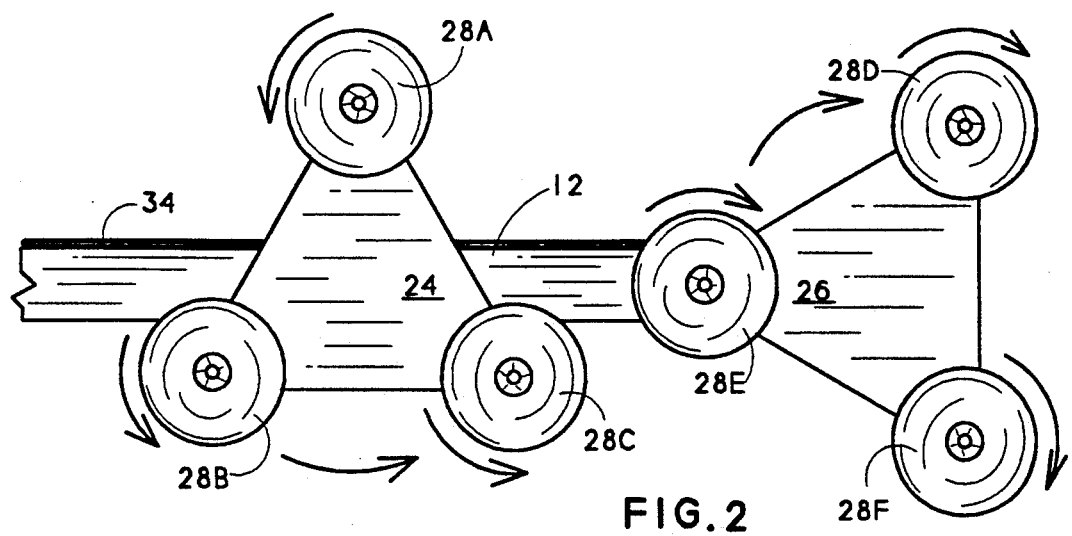
FIG. 2 is an enlarged, fragmentary view seen from beneath of a boom of the machine of FIG. 1.

First power means 30 rotates rotor 24 and the saws 28A-28C counterclockwise as indicated by the arrows in FIG. 2. Means 30 includes hydraulic motor 32 and hydraulic lines 34.

Second power means 36 rotates rotor 26 and the saws 28D-28F clockwise as indicated by the arrows in FIG. 2. Means 36 includes hydraulic motor 38 and hydraulic lines 34.

Machine 2 further includes a second mast 40 projecting upwardly from the base 4 comprising an upper section 42 that telescopes into a lower section 44.

Elongated boom 46 is pivotally connected to the upper section 42 of mast 40 for elevational movement therewith and for pivoting in a vertical plane relative to the upper section 42. The connection of boom 46 to section 42 comprises beam 48, bracket 50 and lever arm 52 which pivots about pin 54 under control of cable system 56 which serves as actuating means between boom 46 and the section 42 for pivoting the boom relative to the section 42 to vary the position of the plane relative to the horizon.

An inboard rotor 58 and an outboard rotor 60 are rotatably mounted on the boom. Three saws 28 are carried on rotor 58 for rotation in a generally parallel plane and three saws 28 are similarly carried on rotor 60.

Third power means 62 rotates rotor 58 and its saws 28 counterclockwise. Means 62 includes hydraulic motor 64 and hydraulic lines 66.

Fourth power means 68 rotates rotor 60 and the saws 28D-28F clockwise as indicated by the arrows in FIG. 2. Means 68 includes hydraulic motor 70 and hydraulic lines 66.

In use of the machine 2, it will typically be pulled by a tractor (not shown) so its wheels 72 roll along the middles 74 between lateral rows of trees (not shown). With the booms 12 and 46 extended as shown in FIG. 1 and elevated to the required height for trimming by the masts 6 and 40 respectively, the inner rotors 24 and 58 with their connected saws rotating CCW, the outer rotors 26 and 60 with their connected saws rotating CW and the machine 2 moving forward, cuttings from the trees are caused by the counter-rotating rotors and saws to be thrown aside of the tree rows into the middles areas thereby keeping the tree tops free of cut brush. In contrast, prior art machines having a pair of rotors with connected saws, all of which rotate in the same direction and not equipped with special attachments to clear cuttings from the tree tops, leave substantial amounts of cut brush in the tree tops as such machines pass down the tree rows.

If it is desired that tree trimming machines of the invention can perform angled topping (gable cut) as well as flat top trimming, the boom 12 may be pivoted between rotors 24 and 26 (not shown) and boom 46 may be similarly pivoted between rotors 59 and 60 (not shown).

I claim:

1. In a tree trimming machine including a mobile base, at least one telescoping mast projecting upwardly from said base, an elongated boom pivotally connected to the upper portion of said mast for elevational movement with said mast and for pivoting in a vertical plane relative to said upper mast portion, an inboard rotor and an outboard rotor both rotatably mounted on said boom, a plurality of saws rotatably carried on each said inboard and outboard rotors for rotation in a generally parallel plane and actuating means between said boom and said upper portion of said mast for pivoting said boom relative to said upper portion to vary the position of said plane relative to the horizon, the improvement which comprises:
    first power means to rotate said inboard rotor and said saws carried thereby counterclockwise and
    second power means to rotate said outboard rotor and said saws carried thereby clockwise.

2. In a tree trimming machine including a mobile base, a first telescoping mast projecting upwardly from said base, an first elongated boom pivotally connected to the upper portion of said first mast for elevational movement with said first mast and for pivoting in a vertical plane relative to said upper mast portion, a first inboard rotor and a first outboard rotor both rotatably mounted on said boom, three saws rotatably carried on each said first inboard and first outboard rotors for rotation in a generally parallel plane and actuating means between said boom and said upper portion of said mast for pivoting said boom relative to said upper portion to vary the position of said plane relative to the horizon, the improvement which comprises:
    first power means to rotate said first inboard rotor and said saws carried thereby counterclockwise and
    second power means to rotate said first outboard rotor and said saws carried thereby clockwise.
    a second telescoping mast projecting upwardly from said base, a second elongated boom pivotally connected to the upper portion of said second mast for elevational movement with said second mast and for pivoting in a second vertical plane relative to said upper mast portion of said second mast, a second inboard rotor and a second outboard rotor both rotatably mounted on said second boom, three saws rotatably carried on each said second inboard and second outboard rotors for rotation in a generally parallel plane and actuating means between said second boom and said upper portion of said second mast for pivoting said second boom relative to said upper portion of said second mast to vary the position of said plane relative to the horizon,
    third power means to rotate said second inboard rotor and said saws carried thereby counterclockwise and
    fourth power means to rotate said second outboard rotor and said saws carried thereby clockwise.

3. The tree trimming machine of claim 2 wherein said rotors are triangular in shape.

4. In a method for trimming trees with a machine that includes a mobile base, at least one telescoping mast projecting upwardly from said base, an elongated boom pivotally connected to the upper portion of said mast for elevational movement with said mast and for pivoting in a vertical plane relative to said upper mast portion, an inboard rotor and an outboard rotor both rotatably mounted on said boom, a plurality of saws rotatably carried on each said inboard and outboard rotors for rotation in a generally parallel plane and actuating means between said boom and said upper portion of said mast for pivoting said boom relative to said upper portion to vary the position of said plane relative to the horizon, the improvement which comprises:
    rotating said inboard rotor and said saws carried thereby counterclockwise and
    rotating said outboard rotor and said saws carried thereby clockwise.

* * * * *